Figure 1:
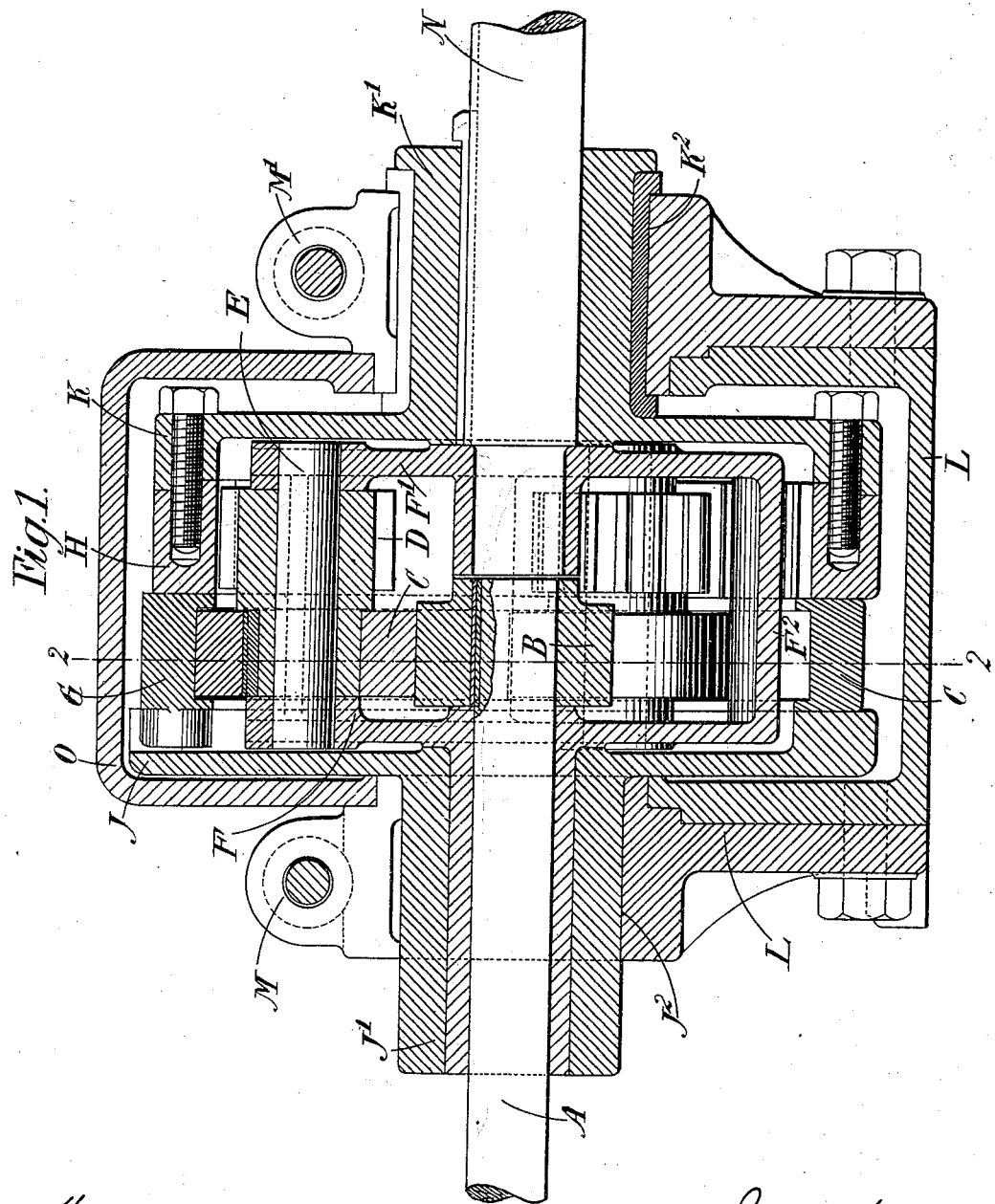

No. 685,503. Patented Oct. 29, 1901.
G. S. BAKER.
WHEEL GEARING FOR TRANSMISSION OF POWER.
(Application filed June 10, 1901.)
(No Model.) 6 Sheets—Sheet 2.

No. 685,503. Patented Oct. 29, 1901.
G. S. BAKER.
WHEEL GEARING FOR TRANSMISSION OF POWER.
(Application filed June 10, 1901.)

(No Model.) 6 Sheets—Sheet 3.

No. 685,503. Patented Oct. 29, 1901.
G. S. BAKER.
WHEEL GEARING FOR TRANSMISSION OF POWER.
(Application filed June 10, 1901.)
(No Model.)
6 Sheets—Sheet 4.

No. 685,503. Patented Oct. 29, 1901.
G. S. BAKER.
WHEEL GEARING FOR TRANSMISSION OF POWER.
(Application filed June 10, 1901.)
(No Model.) 6 Sheets—Sheet 5.
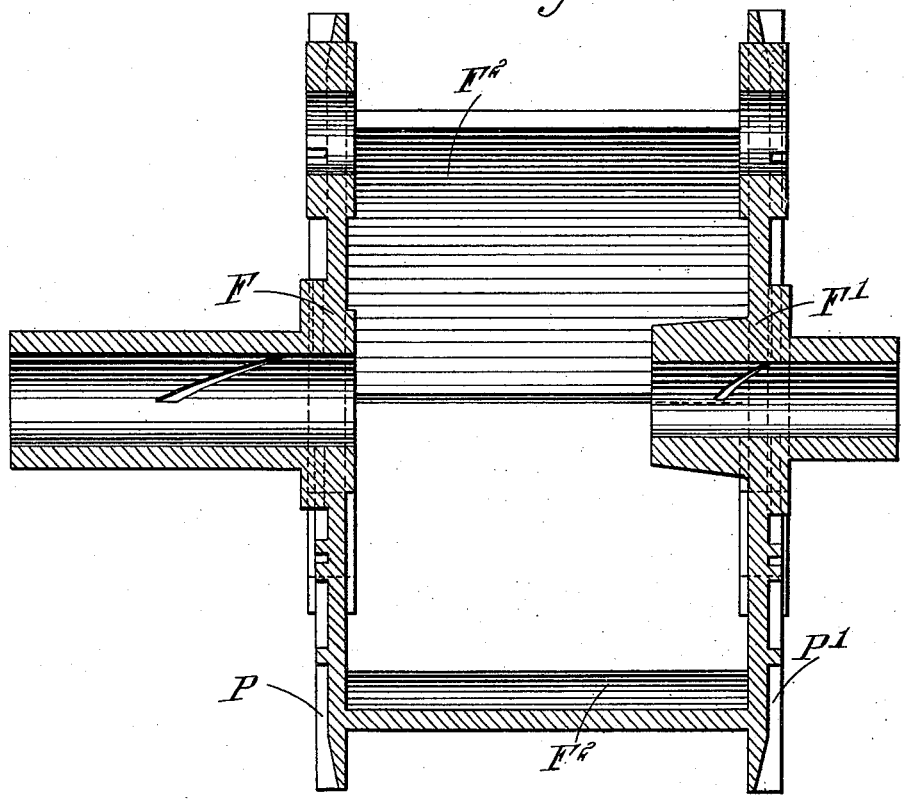

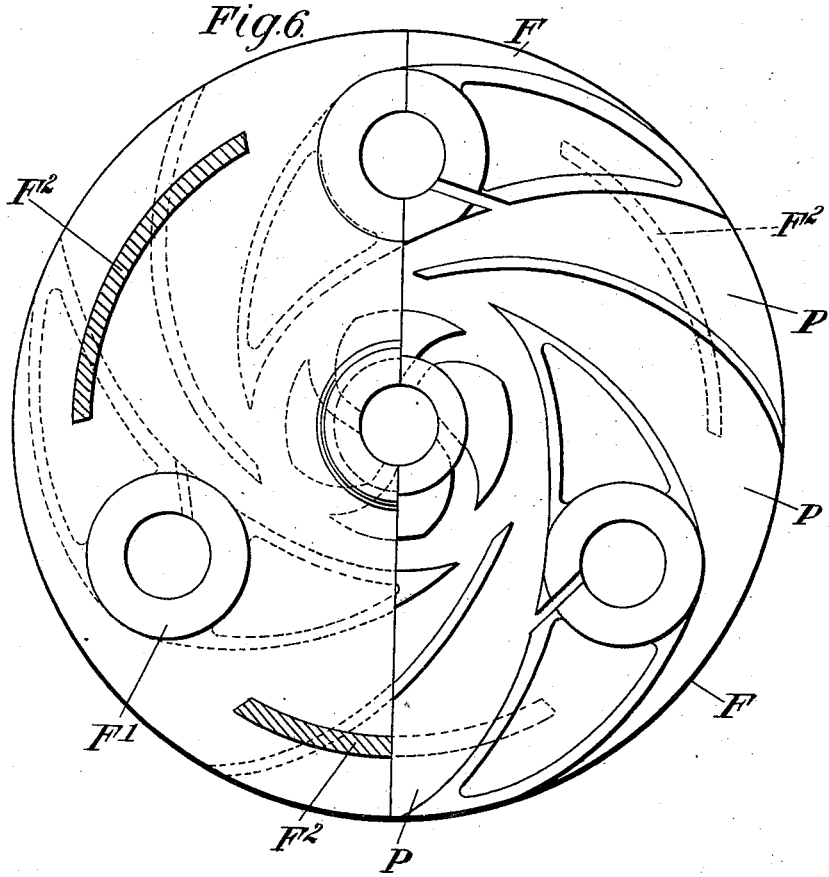

UNITED STATES PATENT OFFICE.

GEORGE SAMUEL BAKER, OF LONDON, ENGLAND.

WHEEL-GEARING FOR TRANSMISSION OF POWER.

SPECIFICATION forming part of Letters Patent No. 685,503, dated October 29, 1901.

Application filed June 10, 1901. Serial No. 63,972. (No model.)

*To all whom it may concern:*

Be it known that I, GEORGE SAMUEL BAKER, a subject of the King of England, residing at London, England, have invented certain new and useful Wheel-Gearing for the Transmission of Power, (for which application has been made in Great Britain under No. 10,325, dated June 5, 1900,) of which the following is a specification.

This invention relates to wheel-gearing for the transmission of power, its principal object being the construction of a gear in which compound pinions, each preferably comprising a toothed portion and a friction driving-surface different in diameter from the pitch-line diameter of the toothed portion, can be advantageously employed for the transmission of power at high speeds of rotation.

Another object of this invention is the employment in the gear comprising such compound pinions of a friction-pulley so arranged and operated as to serve as a starting and stopping device for the gear.

A further object is the combination, with a gear in which compound pinions are used, of a pair of rotatable rings and a locking device whereby one or the other of those rings, or both of them, can be rapidly released or either of them locked to enable reversal of the part driven to be effected with much facility.

An advantage peculiar to the compound pinions employed in the manner hereinafter described is that of their two elements. The frictional one is employed to receive the power in the high-speed portion of the gear, where the stress at the periphery is at any instant slight, whereas the toothed element is used where the transmission is slower and where consequently the peripheral stresses are higher.

In one construction of gear according to this invention a high-speed shaft has upon it a friction-pinion. This pinion gears with other friction-pinions which are disposed about it and are of the compound type which is above referred to. Encircling these compound pinions are two rings, one of them a friction-ring and the other an internally-toothed ring. With the friction-ring the friction elements of the compound pinions gear. With the toothed ring the toothed elements of the compound pinions gear. If the toothed ring be stationary, the friction-ring will be revolved by the action of the compound pulleys, while if the friction-ring be stationary the toothed ring will be rotated, but in a direction of rotation the reverse of that in which the friction-ring previously turned. The compound pinions can be carried on a frame which may either be fixed and stationary or may be a floating frame rotatable concentrically with the high-speed shaft. It is preferred that a duplex locking device, which may consist of a rocking lever, with a braking or bolting device at each end, or may be of any other construction, should be applied to the two rings and that these rings should both be in operative connection with the part that has to be driven; also, the frame aforesaid should preferably be a floating frame. Under such circumstances the part driven can have its direction of motion reversed by operation of the duplex brake to hold one or other of the rings, or if both the rings be released by the duplex brake the high-speed shaft, though still running, will not rotate the driven part. Alternatively either one of the two rings could be connected to the part driven. In such case the frame must be capable of rotation and provided with a braking or locking device. By locking the frame the power would be transmitted through the compound pinions to the chosen ring directly. By releasing the frame and holding one ring the companion ring would be rotated by the differential action of the compound pinions upon the ring held.

The starting and stopping device hereinbefore referred to can conveniently be arranged as follows, it being premised that to permit of its employment the rings aforesaid must be slightly eccentric to the axis of the high-speed first-motion shaft: The starting friction-pulley is supported in such a manner as to be adjustable in the space between the friction-ring and the friction-pulley on the high-speed shaft. This space by reason of the eccentricity of the high-speed shaft is of varying width, so that by moving the starting-pulley around that shaft in contact with the ring it can be caused to press against or recede from the high-speed pulley. It may be adjustably mounted upon the floating frame aforesaid. By forcing the starting-pulley into the diminishing space around the high-speed shaft a frictional grip is set up not only between it and that shaft, but between the companion compound pulleys and the surfaces with which they coöperate, these compound pulleys being allowed for this purpose a slight amount of slack. The compound pulleys might be duplex—that is to say, the frictional portions of each might be duplicated and coaxial, having the toothed element between them. This conduces to the prevention of any tendency of the working parts to slue or bind. Further, two toothed elements of different diameters might be used, gearing with corresponding and separate toothed rings. The floating frame preferably possesses twin portions so disposed that the pulleys or pinions it carries lie between those parts and are squarely held.

The friction starting device hereinbefore referred to can be provided with a spring tending to keep it always in gear and with a device which can be operated to hold it out of gear. This latter is advantageous in cases wherein it is sometimes desirable to let the first-motion shaft run freely before allowing it to start the gear.

In the gear wherein the duplex brake is used the compound pulleys or pinions might have toothed portions of different diameters instead of toothed and frictional portions of different diameters, the rings in such a case being also all toothed.

Figure 2:
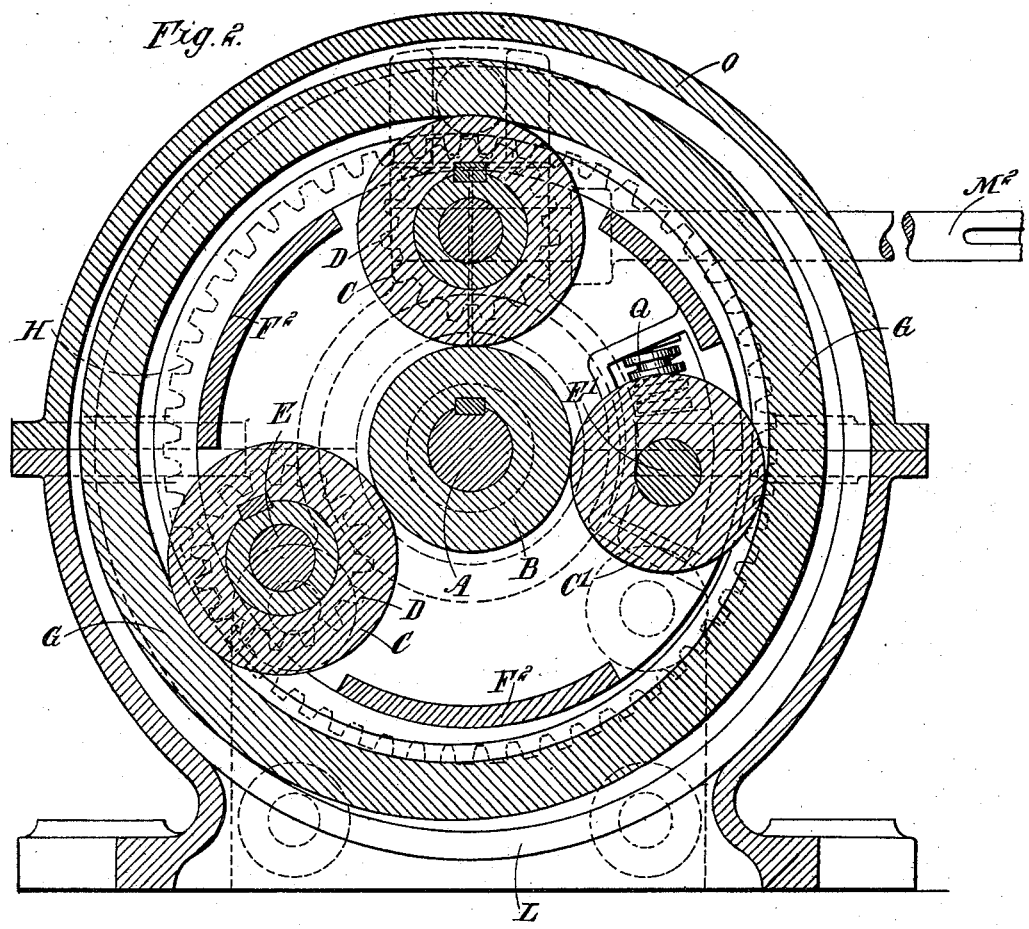
Figure 3:
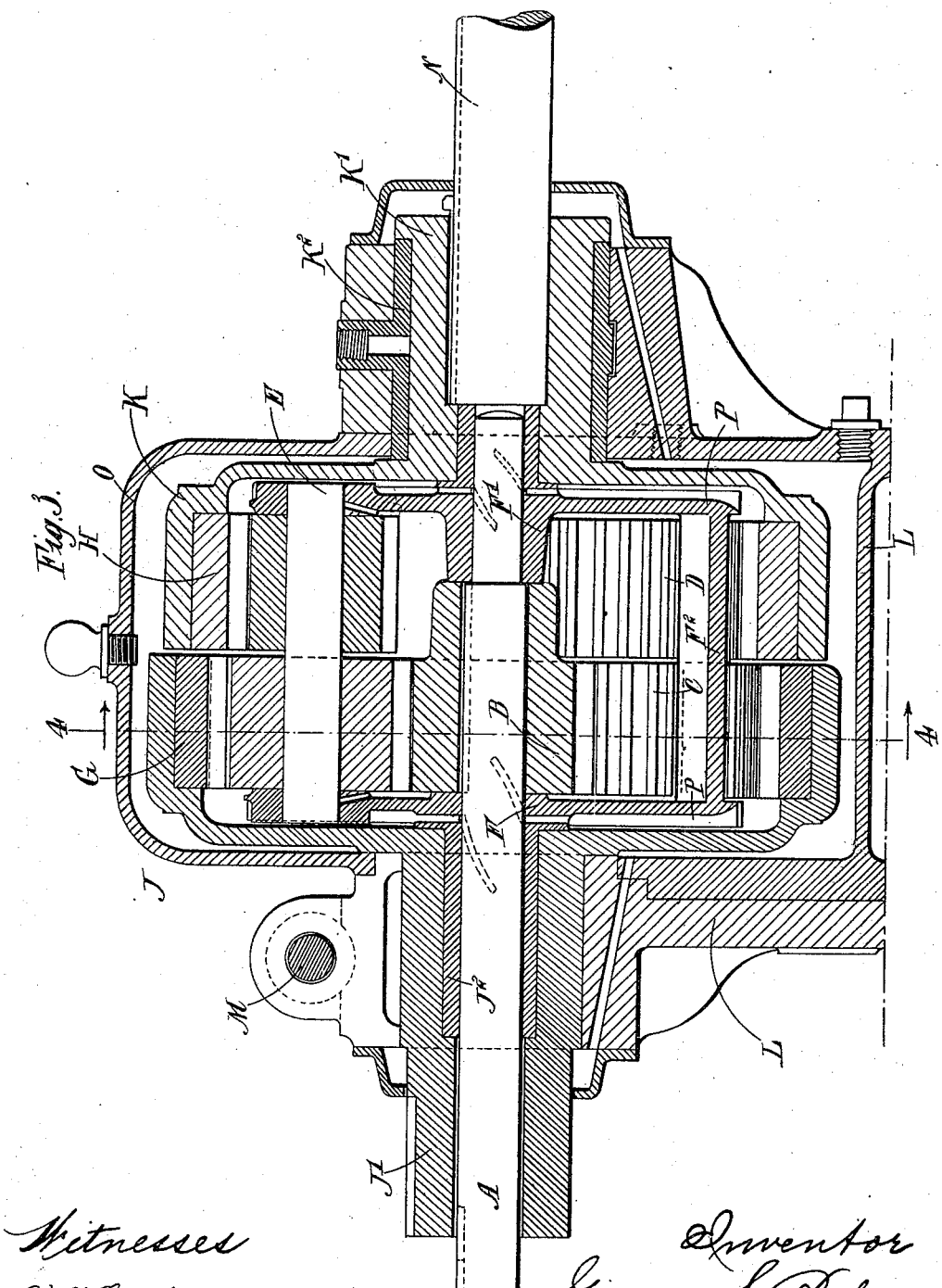
Figure 4:
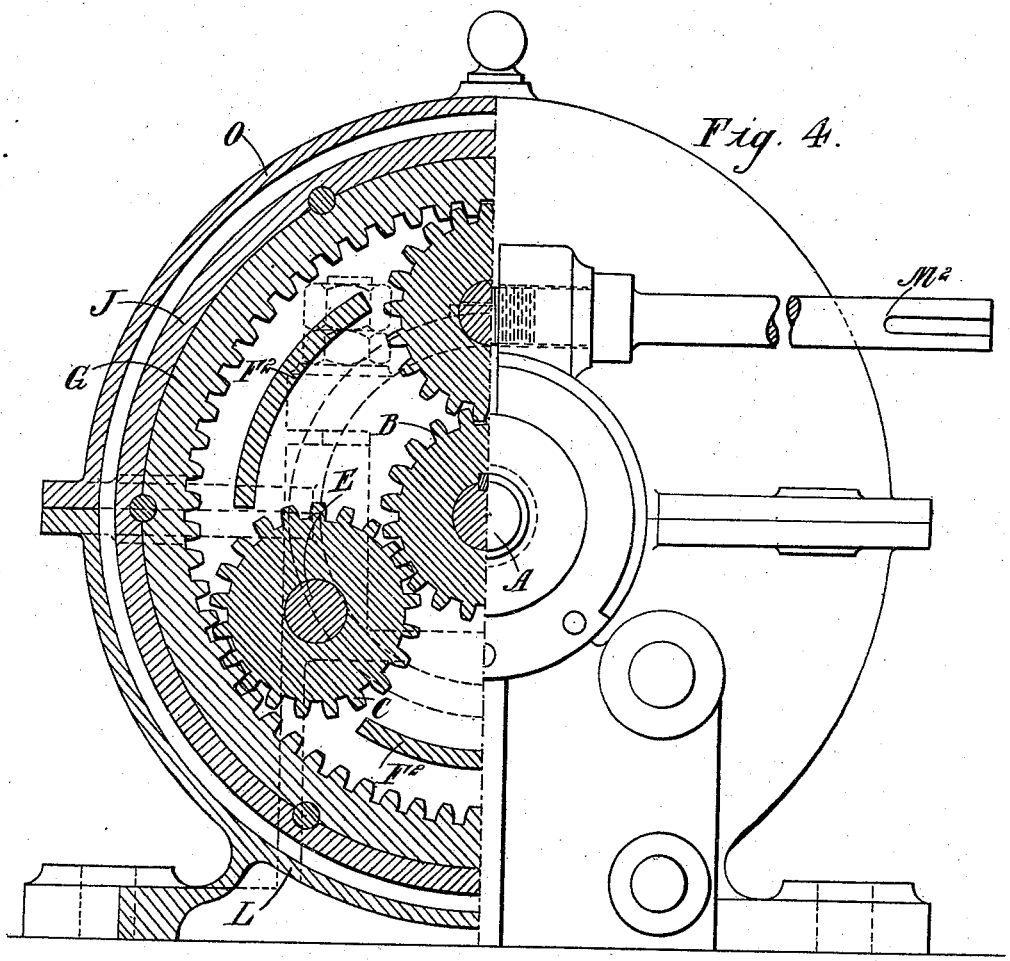

In the accompanying drawings, Figure 1 is a longitudinal vertical section of one construction of the improved speed-gear. Fig. 2 is a transverse vertical section on the line 2 2 of Fig. 1. Fig. 3 is a longitudinal vertical section of another construction of speed-gear, also according to this invention. Fig. 4 is a side elevation, partly in section, on the line 4 4 of Fig. 3; and Figs. 5 and 6 are respectively an elevation and a transverse section of a floating frame forming a portion of the construction illustrated in Figs. 3 and 4.

Like letters indicate like parts throughout the drawings.

With reference first to Figs. 1 and 2, a high-speed shaft A has keyed upon it a friction-pinion B, which gears with other friction-pinions which are disposed about it and each of which comprises a friction driving-surface C and toothed portion D. These compound pinions are mounted on spindles E, which are carried on a floating frame comprising two portions F and F', which are connected by the portions $F^2$ between the pinions. Encircling these compound pinions and gearing therewith are two rings, one of them a friction-ring G, gearing with the friction driving-surfaces C of the pinions, and the other an internally-toothed ring H, gearing with the toothed portions D of the pinions. The floating frame F F' $F^2$ is so constructed that it forms the bearing of the driving-shaft A and at the same time contains the bearings for the spindles E. It thus serves continuously to keep the compound pinions in their proper positions relatively to the driving-shaft. J and K are disks or supports attached to the rings G and H, respectively, whereby either of these rings may be clamped to a casing L by means of locking devices M and M'. If desired, the locking device may be made duplex by the use of a spindle, with worm-screws gearing with worm-wheels on the spindles $M^2$, or by other suitable method, whereby the locking devices M and M' may alternatively be put into or out of action by turning one handle. The disk J terminates in a hollow shaft J', and the disk K is keyed through the collar K' to a shaft N, on each of which shafts a pulley or equivalent may be mounted for connecting the gear to the machine which is to be driven. Bearings $J^2$ $K^2$ are provided for the frame J K, with any suitable lubricators. By prolonging the floating frame F beyond the hollow shaft J' the frame might be locked by any suitable clamp to the casing, and in this case the power would be transmitted directly through the pinions C D to the ring H and through the disk K to the shaft N. By locking the ring G through the frame J by the locking device M the ring H will be rotated by the differential action of the compound pinions, and the power will thus be transmitted at reduced speed through frame K to shaft N. By releasing the ring G and locking the ring H through the disk K by the locking device M' the ring G will be rotated by the differential action of the compound pinions in the opposite direction to the previous rotation of the ring H, and the power will thus be transmitted at reduced speed through the disk J to the hollow shaft J'. Thus by the use of the locking devices M and M' reduced speed in opposite directions may be alternatively obtained from the shafts N and J'. Another duplex locking device for the rings G H may be constructed by removing the cover O of the casing L and substituting therefor a double clamping-ring, whereby either of the rings G H may be directly locked to the casing, the action of the reducing-gear remaining the same.

In the construction shown in Figs. 3 and 4 the driving-pinion B is toothed. The compound pinions C D have toothed portions of different diameters instead of toothed and frictional portions of different diameters, the rings G H being both internally toothed. The clamping device M is shown only at one end, the frame at the other end having a bearing $K^2$. This construction is used when the power is always to be taken from the shaft N. When reversed motion is desired, the bearing $K^2$ is replaced by a clamp-bearing. The action of this construction of gear having compound toothed pinions is substantially the same as that hereinbefore described with reference to the form having pinions with friction driving-surfaces.

Figs. 3 and 4 show a method of keeping all the journals thoroughly lubricated. The circulation of oil is maintained by the floating frame F F', which is provided with centripetal grooves P, as shown in Figs. 5 and 6, through which the oil is carried inward when the floating frame revolves, a supply of oil being contained in the casing L. From the central portion of the floating frame the oil is forced through the various oil-holes to the interior of the central bearings, thus providing a forced lubrication.

In Fig. 2 the ring G is shown slightly eccentric to the axis of the shaft A. A friction-pulley C' is supported on a spindle E' in the floating frame and can be adjusted in the space between the friction-ring G and the friction-pulley B. This space by reason of the eccentricity of the ring G is of varying width, so that when the friction-pinion B revolves the pulley C' will be caused to press against or recede from the friction-ring G. The position of the pulley C is controlled by a spring Q, connected to the floating frame F² and in contact with the pulley C', tending to keep it always in gear. The pulley C' by pressing in between the pinion B and the ring G brings the friction-surfaces C into gear with the ring G.

When the eccentric starting device is employed, the ring G is connected to the disk J by a projection moving in a radial slot in the disk, as shown in Fig. 1, in order that the eccentric ring may run successively over the friction-pinions when the ring acts as the driven member of the combination.

In the construction illustrated the frame F is quite free to revolve and acts as a floating frame. The advantage of a floating frame comprising two portions, one supporting each end of the pinion-spindles, is that the pinions are kept quite true, all twisting action and centrifugal action on the pinions being taken up by the frame. If desired, the spindles E may be carried on roller-bearings in the floating frame.

Instead of mounting pulleys on the shafts N and J' friction-clutches may be employed to connect the gear to the machine which is to be driven.

In the constructions illustrated only compound pinions having two portions are shown; but obviously there might be more than two portions with corresponding rings.

What I claim as my invention, and desire to secure by Letters Patent, is—

1. In a speed-gear the combination of a high-speed shaft, a pinion keyed thereon, a compound pinion gearing therewith, a rotatable support for the compound pinion, a plurality of rotatable rings each encircling and gearing with one element of the compound pinion, outside shafts and means for connecting each rotatable ring to one of the said outside shafts and means for locking each ring.

2. In a speed-gear the combination of a high-speed shaft, a friction driving-pinion keyed thereon, a compound pinion having a friction element gearing with the driving-pinion, a rotatable support for the compound pinion, a plurality of rotatable rings each encircling and gearing with one element of the compound pinion, outside shafts, means for connecting each rotatable ring to one of the said outside shafts and means for locking each ring.

3. In a speed-gear, the combination of a high-speed shaft, a friction driving-pinion keyed thereon, a compound pinion having one friction element gearing with the driving-pinion, a rotatable support for the compound pinion, a plurality of rotatable rings each encircling and gearing with one element of the compound pinion, the friction-ring being eccentric, outside shafts, means for connecting each rotatable ring to one of said outside shafts, means for locking each ring, a friction-pulley and means for pressing said friction-pulley between the driving-pinion and the eccentric ring.

4. In a speed-gear the combination of a high-speed shaft, a friction driving-pinion keyed thereon, a compound pinion having one friction element gearing with the driving-pinion, a rotatable support for the compound pinion, a plurality of rotatable rings each encircling and gearing with one element of the compound pinion, the friction-ring being eccentric, outside shafts, means for connecting each rotatable ring to one of the said outside shafts, means for locking each ring, a friction-pulley, means for pressing the friction-pulley between the driving-pinion and the eccentric ring, means for automtically conveying oil to the journals of the compound pinions, and means for preventing the compound pinion from rotating around the driving-shaft.

5. In a speed-gear the combination of a high-speed shaft, a friction driving-pinion keyed thereon, a compound pinion having one friction element gearing with the driving-pinion, a rotatable support for the compound pinion, a plurality of rotatable rings each encircling and gearing with one element of the compound pinion the friction-ring being eccentric, outside shafts, means for connecting each rotatable ring to one of said outside shafts, means for locking each ring, a friction-pulley, means for pressing said friction-pulley between the driving-pinion and the eccentric ring, means for automatically conveying oil to the journals of the compound pinions, and means for preventing the compound pinion from rotating around the driving-shaft.

6. In a speed-gear the combination of a high-speed shaft, a pinion keyed thereon, a compound pinion gearing therewith, a rotatable support for the compound pinion, a plurality of rotatable rings each encircling and gearing with one element of the compound pinion, means for automatically conveying oil to the journals of the compound pinions, outside shafts, means for connecting each rotatable ring to one of said outside shafts and means for locking each ring.

7. In a speed-gear the combination of a high-speed shaft, a pinion geared thereon, a compound pinion gearing therewith, a rotatable support for the compound pinion in the form of a floating frame comprising two connected portions which support the ends of the spindle of the compound pinion, a plurality of rotatable rings each encircling and gearing with one element of the compound pinion, outside shafts, a connection from each ring to one of said outside shafts and a clamp on each shaft.

8. In a speed-gear the combination of a high-speed shaft, a friction driving-pinion keyed thereon, a compound pinion having a friction element gearing with the driving-pinion, a rotatable support for the compound pinion in the form of a floating frame comprising two connected portions which support the ends of the spindle of the compound pinion, a plurality of rotatable rings each encircling and gearing with one element of the compound pinion, hollow shafts, a disk attached to each rotatable ring and each connected to one of said hollow shafts and a clamp on each shaft.

9. In a speed-gear the combination of a high-speed shaft, a friction driving-pinion keyed thereon, a compound pinion having a friction element gearing with the driving-pinion, a rotatable support for the compound pinion in the form of a floating frame comprising two connected portions which support the ends of the spindle of the compound pinion, a plurality of rotatable rings each encircling and gearing with one element of the compound pinion, hollow shafts, a disk attached to each rotatable ring and each connected to one of said hollow shafts, a screw-clamp on each hollow shaft, and means for operating the said clamps.

10. In a speed-gear the combination of a high-speed shaft, a friction driving-pinion keyed thereon, a compound pinion having a friction element gearing with the driving-pinion, a rotatable support for the compound pinion in the form of a floating frame comprising two connected portions which support the ends of the spindle of the compound pinion, a plurality of rotatable rings each encircling and gearing with one element of the compound pinion, the friction-ring being eccentric, hollow shafts, a disk attached to each rotatable ring and each connected to one of said hollow shafts, means for operating the clamps and a spring-controlled friction-pinion between the driving-pinion and the eccentric friction-ring.

11. In a speed-gear the combination of a high-speed shaft, a friction driving-pinion keyed thereon, a compound pinion having a friction element gearing with the driving-pinion, a rotatable support for the compound pinion in the form of a floating frame comprising two connected portions which support the ends of the spindle of the compound pinion, a plurality of rotatable rings each encircling and gearing with one element of the compound pinion, the friction-ring being eccentric, hollow shafts, a disk attached to each rotatable ring and each connected to one of said hollow shafts, a clamp on the hollow shaft, means for operating the clamps, a spring-controlled friction-pinion between the driving-pinion and the eccentric friction-ring, and centripetal lubricating-grooves on the sides of the floating frame.

12. In a speed-gear the combination of a high-speed shaft, a friction driving-pinion keyed thereon, a compound pinion having a friction element gearing with the driving-pinion, a rotatable support for the compound pinion in the form of a floating frame comprising two connected portions which support the ends of the spindle of the compound pinion, a plurality of rotatable rings each encircling and gearing with one element of the compound pinion, the friction-ring being eccentric, hollow shafts, a disk attached to each rotatable ring and each connected to one of said hollow shafts, means for operating the clamps, a spring-controlled friction-pinion between the driving-pinion and the eccentric friction-ring, centripetal lubricating-grooves on the sides of the floating frame and a clamp for the floating frame.

In testimony whereof I have signed my name to this specification in the presence of two subscribing witnesses.

GEORGE SAMUEL BAKER.

Witnesses:
ARTHUR J. PEIRCE,
WILLIAM C. HALE.